US009213835B2

(12) United States Patent
Lesea et al.

(10) Patent No.: US 9,213,835 B2
(45) Date of Patent: Dec. 15, 2015

(54) METHOD AND INTEGRATED CIRCUIT FOR SECURE ENCRYPTION AND DECRYPTION

(75) Inventors: Austin H. Lesea, Los Gatos, CA (US); Stephen M. Trimberger, San Jose, CA (US)

(73) Assignee: XILINX, INC., San Jose, CA (US)

( * ) Notice: Subject to any disclaimer, the term of this patent is extended or adjusted under 35 U.S.C. 154(b) by 514 days.

(21) Appl. No.: 12/755,792

(22) Filed: Apr. 7, 2010

(65) Prior Publication Data

US 2011/0252244 A1  Oct. 13, 2011

(51) Int. Cl.
G06F 21/00 (2013.01)
G06F 21/55 (2013.01)
G06F 21/72 (2013.01)

(52) U.S. Cl.
CPC .............. G06F 21/558 (2013.01); G06F 21/72 (2013.01)

(58) Field of Classification Search
CPC ............................... G06F 21/558; G06F 21/72
USPC ...................................... 380/46, 29; 713/189
See application file for complete search history.

(56) References Cited

U.S. PATENT DOCUMENTS

| 4,809,703 | A | | 3/1989 | Ishikawa et al. |
| 5,404,402 | A | * | 4/1995 | Sprunk ........................... 713/189 |
| 6,086,629 | A | * | 7/2000 | McGettigan et al. .......... 716/113 |
| 6,144,230 | A | * | 11/2000 | Kim ................. 327/51 |
| 6,205,421 | B1 | | 3/2001 | Morii |
| 6,327,661 | B1 | | 12/2001 | Kocher et al. |
| 6,356,555 | B1 | | 3/2002 | Rakib et al. |
| 6,970,561 | B1 | * | 11/2005 | Obana ............................ 380/28 |
| 7,031,370 | B1 | | 4/2006 | Fukumasa |
| 7,123,579 | B1 | | 10/2006 | Lyu |
| 7,215,656 | B1 | | 5/2007 | Kim et al. |
| 7,389,316 | B1 | | 6/2008 | Baetoniu |
| 7,500,110 | B2 | | 3/2009 | Peeters et al. |
| 7,853,012 | B2 | | 12/2010 | Sarangarajan et al. |
| 2001/0024956 | A1 | | 9/2001 | You et al. |
| 2003/0053625 | A1 | * | 3/2003 | Bially et al. .................... 380/42 |
| 2003/0084336 | A1 | * | 5/2003 | Anderson et al. ............. 713/200 |
| 2003/0154226 | A1 | | 8/2003 | Knmelnik |
| 2003/0182649 | A1 | * | 9/2003 | Harn ............................... 716/11 |
| 2005/0111524 | A1 | | 5/2005 | Baker et al. |
| 2005/0271202 | A1 | * | 12/2005 | Shu et al. ........................ 380/29 |
| 2007/0213062 | A1 | | 9/2007 | Medlock et al. |

(Continued)

OTHER PUBLICATIONS

Moore, Simon et al., "Improving Smart Card Security using Self-timed Circuits," Proceedings of the Eighth International Symposium on Asynchronous Circuits and Systems, 2002, pp. 1-8.*
U.S. Appl. No. 12/755,027, filed Apr. 7, 2010, Lesea.
Bucci, Marco et al., "A Countermeasure Against Differential Power Analysis Based on Random Delay Insertion," *Proc. of the IEEE International Symposium on Circuits and Systems*, May 23, 2005, pp. 3547-3550, IEEE, Piscataway, New Jersey, USA.

(Continued)

*Primary Examiner* — Michael Pyzocha
(74) *Attorney, Agent, or Firm* — LeRoy D. Maunu

(57) ABSTRACT

In one embodiment of the present invention, a secure cryptographic circuit arrangement is provided. The secure cryptographic circuit includes a cryptographic processing block, a spreading sequence generator, and a delay control circuit. The cryptographic processing block has a plurality of signal paths. One or more of the plurality of signal paths includes respective adjustable delay circuits. The spreading sequence generator is configured to output a sequence of pseudo-random numbers. The delay control circuit has an input coupled to an output of the spreading sequence number generator and one or more outputs coupled to respective delay adjustment inputs of the adjustable delay circuits. The delay control circuit is configured to adjust the adjustable delay circuits based on the pseudo-random numbers.

13 Claims, 4 Drawing Sheets

(56) References Cited

U.S. PATENT DOCUMENTS

| | | | |
|---|---|---|---|
| 2008/0098233 A1 | 4/2008 | Dewkett et al. | |
| 2008/0123446 A1* | 5/2008 | Pickles | 365/194 |
| 2008/0181319 A1 | 7/2008 | Kao et al. | |
| 2008/0231240 A1 | 9/2008 | Parkes et al. | |
| 2008/0259683 A1 | 10/2008 | Lisi et al. | |
| 2009/0039919 A1* | 2/2009 | Verbauwhede et al. | 326/46 |
| 2009/0106339 A1* | 4/2009 | Vasyltsov | H03K 3/84 708/251 |
| 2009/0248771 A1* | 10/2009 | Vergnes et al. | 708/251 |
| 2009/0279687 A1* | 11/2009 | Yoshimoto et al. | 380/28 |
| 2009/0307516 A1* | 12/2009 | Renaudin et al. | 713/401 |
| 2010/0002751 A1 | 1/2010 | Dent | |
| 2010/0054759 A1 | 3/2010 | Oda et al. | |
| 2010/0067685 A1* | 3/2010 | Okita | 380/28 |
| 2010/0119003 A1 | 5/2010 | Terabe et al. | |
| 2010/0150340 A1* | 6/2010 | Choi et al. | 380/28 |
| 2011/0096925 A1* | 4/2011 | Zhu et al. | 380/256 |
| 2011/0163818 A1* | 7/2011 | Dichtl | G06F 7/588 331/57 |
| 2011/0167279 A1* | 7/2011 | Danger et al. | 713/193 |
| 2011/0228255 A1 | 9/2011 | Li et al. | |
| 2011/0285420 A1* | 11/2011 | Deas et al. | 326/8 |
| 2012/0072737 A1* | 3/2012 | Schrijen et al. | 713/189 |
| 2012/0213358 A1* | 8/2012 | Dror | G06F 7/588 380/28 |

OTHER PUBLICATIONS

Golic, Jovan DJ., "New Methods for Digital Generation and Postprocessing of Random Data," *IEEE Transactions on Computers*, Oct. 1, 2006, vol. 55, No. 10, pp. 1217-1229, IEEE, Los Alamitos, California, USA.

Lu, Yingxi et al., "FPGA Implementation and Analysis of Random Delay Insertion Countermeasure Against DPA," *Proc. of the 2008 International Conference on Field-Programmable Technology*, Dec. 8, 2008, pp. 201-208, IEEE, Piscataway, New Jersey, USA.

Schellekens, Dries et al., "FPGA Vendor Agnostic True Random Number Generator" *Proc. of the 2006 International Conference on Field Programmable Logic and Applications*, Aug. 1, 2006, pp. 1-6, IEEE, Piscataway, New Jersey, USA.

Hauck, Scott et al., "Logic Elements," *Reconfigurable Computing: The Theory and Practice of FPGA-Based Computation*, Nov. 2, 2007, pp. 4-5, Morgan Kaufman Publishers, Burlington, Massachusetts, USA.

Johnson, Howard et al., "Elmore Delay Estimation (RC Region)," *High-Speed Signal Propagation: Advanced Black Magic*, Feb. 24, 2003, pp. 141-142, Prentice Hall, Upper Saddle River, New Jersey, USA.

Wolf, Wayne, "Path Delay," *Modern VLSI Design: IP-Based Design*, 4th Edition, Dec. 21, 2008, pp. 222-223, Prentice Hall, Upper Saddle River, New Jersey, USA.

* cited by examiner

METHOD AND INTEGRATED CIRCUIT FOR SECURE ENCRYPTION AND DECRYPTION

FIELD OF THE INVENTION

The present invention generally relates to encryption, and more particularly to the encryption of data used to reconfigure programmable logic.

BACKGROUND

Programmable logic circuits are integrated circuits (ICs) that are user configurable and capable of implementing digital logic operations. There are several types of programmable logic ICs, including Complex Programmable Logic Devices (CPLDs) and Field Programmable Gate Arrays (FPGAs). CPLDs include function blocks based on programmable logic array (PLA) architecture and programmable interconnect lines to route and transmit signals between the function blocks. FPGAs include configurable logic blocks (CLBs) arranged in rows and columns, input output blocks surrounding the CLBs, and programmable interconnect lines that route and transmit signals between the CLBs. Each CLB includes look-up tables and other configurable circuitry that is programmable to implement a logic function. The function blocks of CPLDs, CLBs of FPGAs and interconnect lines are configured by data stored in a configuration memory of the respective devices.

Designs implemented in programmable logic have become complex. Due to the time and investment required for design and debugging, it is desirable to protect the design from unauthorized copying. Efforts have been made to encrypt designs and provide the encrypted designs to the target devices. Several encryption algorithms, for example, the standard Data Encryption Standard (DES) and the more secure Advanced Encryption Standard (AES) algorithms, are known for encrypting blocks of data. Additionally, a one-time encryption pad may be used as a cipher for encrypting blocks of data by XORing blocks of data with blocks of the one-time pad (OTP). These approaches require provision of a key to the structure that decrypts the design, and the key must be protected from unauthorized discovery A decryption key can be stored in nonvolatile memory of a programmable integrated circuit. An encrypted bitstream can then be loaded into the IC and decrypted using the key within the programmable logic. This prevents an attacker from reading the bitstream as it is being loaded into the programmable logic IC. However, this structure must also protect from modes of attack in which the attacker attempts to obtain the decryption key stored in the programmable IC. If the attacker obtains the decryption key, the attacker can decrypt an intercepted bitstream to reveal the unencrypted design.

One method through which an attacker may attempt to discover the decryption key is known as power analysis. In a power analysis attack, current used by a device is monitored while the device is decrypting. During normal operation, the amount of power used by a device varies depending on the logic gates activated at a given time. By monitoring variations in the power consumption while the device is decrypting a configuration bitstream, for example, the attacker can identify operations that are performed and determine the decryption key.

The present invention may address one or more of the above issues.

SUMMARY

In one embodiment of the present invention, a secure cryptographic circuit arrangement is provided. The secure cryptographic circuit includes a cryptographic processing block, a spreading sequence generator, and a delay control circuit. The cryptographic processing block has a plurality of signal paths. One or more of the plurality of signal paths includes respective adjustable delay circuits. The spreading sequence generator is configured to output a sequence of pseudo-random numbers. The delay control circuit has an input coupled to an output of the spreading sequence number generator and one or more outputs coupled to respective delay adjustment inputs of the adjustable delay circuits. The delay control circuit is configured to adjust the adjustable delay circuits based on the pseudo-random numbers.

In another embodiment, the delay control circuit is configured to adjust each of the adjustable delay circuits based on different bits of the pseudo-random numbers.

In another embodiment, the one or more of the plurality of signal paths each include a respective input of the cryptographic processing block. The respective adjustable delay circuits are coupled to the respective inputs of the cryptographic processing block.

In another embodiment, the spreading sequence number generator includes a ring oscillator and a linear feedback shift register circuit. The linear feedback shift register circuit has an input coupled to an output of the ring oscillator and an input coupled to the output of the spreading sequence number generator.

In another embodiment, the ring oscillator is configured to oscillate at a first frequency and the linear feedback shift register are driven by a clock having a second frequency different from the first frequency.

In another embodiment, the delay control circuit is configured to adjust each of the adjustable delay circuits by a respective delay value. The respective delay values are selected from a lookup table according to the pseudo-random number.

In another embodiment, a method is provided for resisting power analysis during configuration of a programmable integrated circuit (IC). An encrypted bitstream is input to the programmable IC. The encrypted bitstream is decrypted with a decryption circuit. Configuration memory of the programmable IC is programmed with the decrypted bitstream. Concurrently with the decrypting of the encrypted bitstream, respective delays on one or more signal paths of the decryption circuit are adjusted to produce power fluctuations that are resistant to power analysis.

In another embodiment, respective delays on one or more signal paths are adjusted by generating a pseudo-random spreading sequence and adjusting respective delays on one or more signal paths based on the pseudo-random spreading sequence.

In another embodiment, the one or more signal paths includes at least a first signal path and a second signal path. Respective delays on one or more signal paths are adjusted by: setting the delay of the first signal path to a first delay value; and setting the delay of the second signal path to a second delay value.

In another embodiment, the one or more signal paths includes at least a first signal path and a second signal path. Respective delays on one or more signal paths are adjusted to set the respective delays of the one or more signal paths to a common delay value.

In another embodiment, the one or more signal paths are critical signal paths.

In another embodiment, the pseudo-random spreading sequence is a truly random spreading sequence.

In yet another embodiment, a method is provided for resisting power analysis during decryption of data in an integrated circuit. Encrypted data is input to the integrated circuit and decrypted. Concurrently with the decrypting of the encrypted data, respective delays on one or more signal paths of the integrated circuit are adjusted to produce power fluctuations that are resistant to power analysis.

In another embodiment, respective delays on one or more signal paths are adjusted by generating a pseudo-random spreading sequence and adjusting the respective delays on one or more signal paths based on the pseudo-random spreading sequence.

In another embodiment, the one or more signal paths includes at least a first signal path and a second signal path. The adjusting respective delays on one or more signal paths includes setting the delay of the first signal path to a first delay value and setting the delay of the second signal path to a second delay value.

In another embodiment, the one or more signal paths includes at least a first signal path and a second signal path. The adjustment of respective delays on one or more signal paths sets the respective delays of the one or more signal paths to a common delay value.

In another embodiment, the one or more signal paths are critical signal paths.

In another embodiment, noise is generated on a power supply line of the integrated circuit concurrently with the decrypting of the encrypted data.

In another embodiment, the adjustment of respective delays on one or more signal paths based on the pseudo-random spreading sequence includes adjusting resistances of the one or more signal paths based on the pseudo-random spreading sequence included.

In yet another embodiment, the adjustment of respective delays on one or more signal paths based on the pseudo-random spreading sequence includes adjusting capacitances of the one or more signal paths based on the pseudo-random spreading sequence included.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

Figure 1:
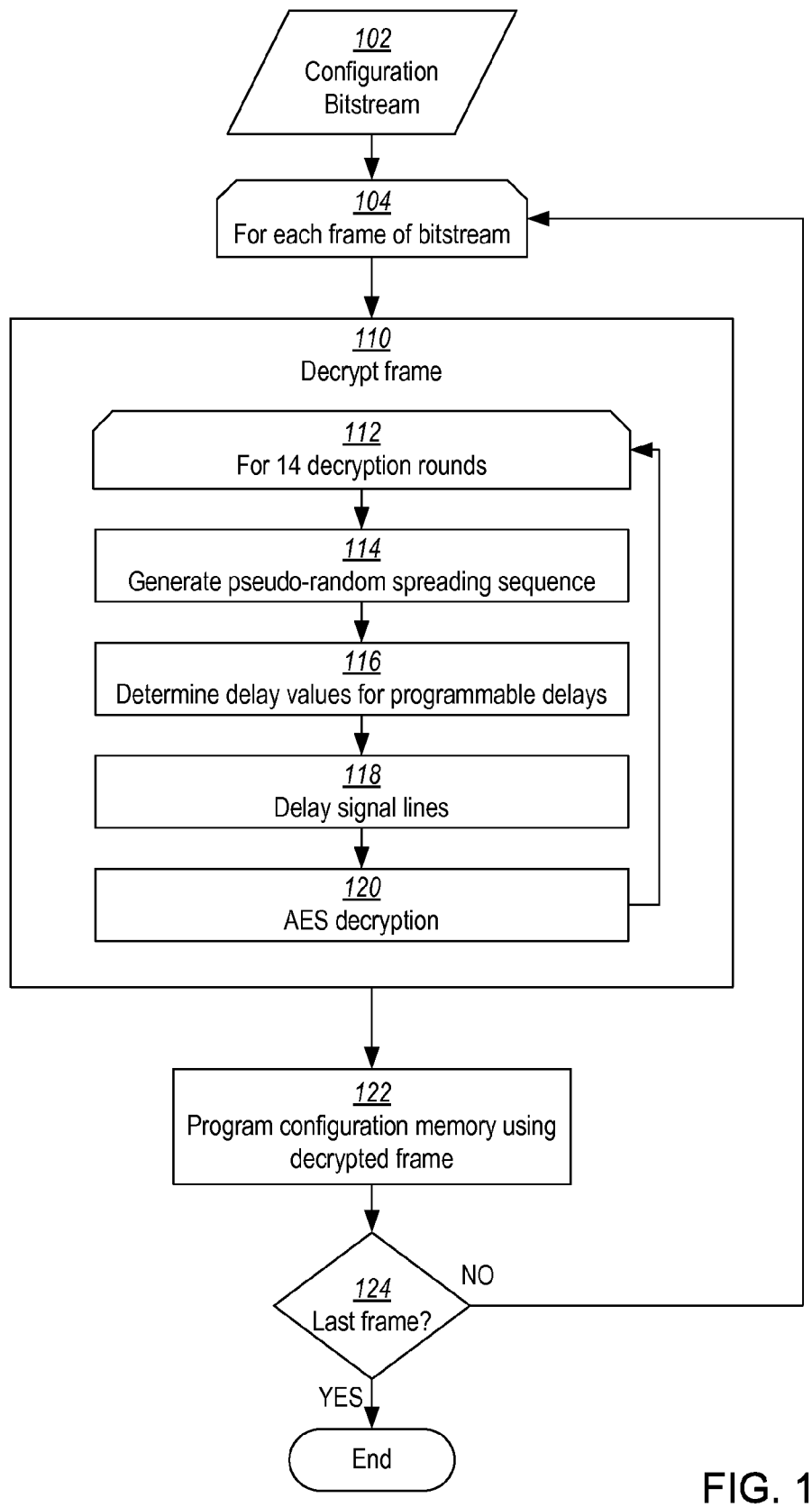
FIG. 1 shows a flowchart of an example process for configuration of programmable logic in accordance with several embodiments of the present invention.

During configuration of programmable logic, the configuration bitstream data can be intercepted and used to make unauthorized copies of the design. Although the configuration bitstream can be encrypted, the decryption key is vulnerable to discovery through power analysis. In a power analysis attack, current used by a device is monitored over time. During normal operation, the amount of power used by a device varies depending on the logic gates activated at a given time. By monitoring variations in the power consumption during decryption, the attacker can identify operations that are performed and determine the decryption key. The present invention provides countermeasures that may be implemented with software or hardware to improve resistance to power analysis attacks.

In a simple power analysis (SPA) attack, current used by a device is monitored over time. During normal operation, the amount of power used by a device varies depending on the logic gates activated at a given time. By monitoring variations in the power consumption, the attacker can identify different operations that are performed. For example, if a programmable IC implements DES encryption, sixteen rounds of encryption/decryption are performed on each block of data. Because similar operations are performed for each round, a power consumption data can be identified for each round. Comparison of power consumption of different rounds can identify key dependent operations and, ultimately, the key used for decryption. For example, the DES key schedule is produced by rotating 28-bit key registers. The rotations are generally implemented using a right shift operation where a zero is shifted into the most significant bit by default. If the bit of the key shifted out of the register is a one, an additional operation is needed to cause the most significant bit to be equal to one. Therefore, a different power signature will be produced for each rotation depending on the bit of the decryption key. As used herein, a power signature may be referred to as power fluctuations, a power consumption signature, or a power consumption waveform, and such terms are used interchangeably herein. Other encryption ciphers, including both symmetric and asymmetric ciphers, also include key dependent operations that are susceptible to power analysis.

Random noise may be generated and added to modulate a power consumption waveform and conceal key dependent processes. However, even when the magnitude of the variations in power consumption are small in comparison to other power signals or noise, power variations of each operation can be detected and isolated using frequency filters and statistical analysis. This is known as differential power analysis (DPA). In DPA, a large number of samples are gathered by repeating encryption over a number of cycles. Samples gathered from each cycle are compared and analyzed to identify a common power signature among the repeated cycles from which the decryption can be identified. For example, added noise can be negated through statistical averaging. When random noise is evenly distributed, the noise will have little effect on the average of power consumption data from repeated rounds of decryption.

The embodiments of the present invention provide a method and circuit in which timing is adjusted on a pseudo-random basis. The timing adjustment increases the complexity of statistical analysis because power consumption waveforms compared from different encryption rounds may not be aligned in the time domain. When waveforms are not aligned, more advanced algorithms and/or larger data samples are needed by an attacker to identify similarities in various rounds of repeated decryption. The embodiments of the present invention may be used alone or in combination with other DPA mitigation techniques such as random noise generation, signal to noise reduction, or clock skipping.

In one embodiment of the present invention, a pseudo-random spreading sequence is generated and is used to adjust one or more adjustable delays included in encryption/decryption circuitry. By adjusting the delays, different logical portions of the encryption/decryption circuitry will be triggered at slightly different times. Because different logical portions are triggered at different times, transistors will not change state in a uniform consistent fashion. Rather, the transistors will switch on or off according to the programmed delay. Although the amount of delay is not enough to affect the logical functions of the circuit, the adjustment has a significant effect on DPA. When transistors are synchronized to switch on at substantially the same time, a large peak is created in the power consumption waveform. By distributing variation in the time in which transistor switching occurs, peaks of the power consumption waveform are smoothed and widened. In this manner, it becomes more difficult to identify or distinguish different cryptographic operations using DPA.

FIG. 1 shows a flowchart of an example process for configuration of programmable logic in accordance with one or more embodiments of the present invention. An encrypted configuration bitstream 102 is received by a programmable IC. Each frame (step 104) of the encrypted configuration bitstream is decrypted at step 110. In this example, AES decryption is implemented. In AES, the decryption process 120 is repeated for fourteen rounds (step 112) for each frame of the encrypted bitstream, assuming a 256-bit key is used. When decryption of a frame has completed, configuration memory of the programmable IC is programmed with the decrypted frame at step 122. The process is repeated at decision step 124 until all frames have been decrypted. During decryption, adjustable delay elements are set to delay input signal lines to the decryption block. The adjustable delay elements are controlled based on a pseudo-random spreading sequence. In each round, a pseudo-random spreading sequence is generated at step 114. A delay value for each of the adjustable delays is determined from the pseudo-random number at step 116. Input signal lines are delayed at step 118. Because some signal lines are delayed, different portions of the decryption logic will become active at slightly different times.

The delay is selected such that timing is varied within an operable tolerance. For example, if a system control clock cycle of the circuit is selected to be 100 nanoseconds, a delay adjustment of +−10 nanoseconds is not likely to affect correct operation because all transistors can switch before the falling edge of the system control clock.

One skilled in the art will recognize that the present invention is applicable to a number of other synchronous encryption algorithms such as DES, DES-3, Blowfish, etc; as well as asynchronous encryption algorithms such as RSA, DSA, etc.

Figure 2:
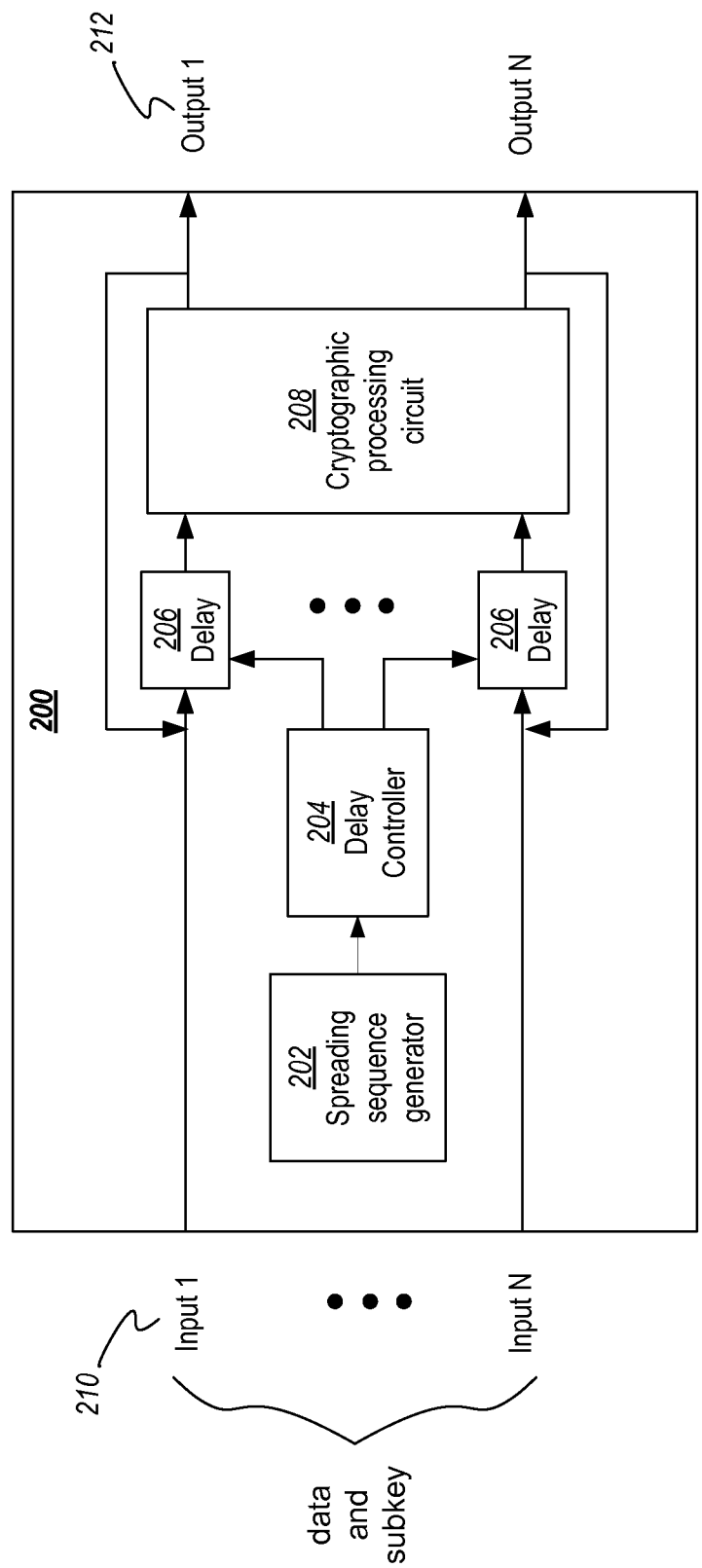
FIG. 2 shows a block diagram of an example circuit for encryption/decryption configured according to several embodiments of the invention.

While DPA of the resulting power consumption waveform is difficult, the power consumption waveform can be easily modulated through timing adjustment with little additional hardware or processing. In one embodiment, a circuit is provided for DPA resistant encryption and decryption. FIG. 2 shows a block diagram of a circuit for encryption/decryption configured according to one or more embodiments of the invention. Circuit 200 includes a cryptographic processing circuit 208 for encrypting/decrypting data. In this example, the cryptographic processing circuit 208 includes a number of signal inputs 210 for receiving data blocks and sub-keys. The circuit includes a number of adjustable delay elements 206 coupled to receive signals from inputs 210, and output the data values to the cryptographic processing circuit 208 after a particular delay has passed. The amount of time by which a signal is delayed by an adjustable delay circuit 206 is controlled by delay controller 204. The delay controller 204 acts with spreading sequence generator 202, to randomize delay times. The delay controller 204 uses a spreading sequence output from the spreading sequence generator 202 to determine a respective delay value for each adjustable delay 206. In some embodiments, the spreading sequence generator may be implemented using a random or pseudo-random number generator to output pseudo-random numbers that will be used as the spreading sequence.

The delay controller 204 may determine a delay value in a number of different ways. In one example implementation, a delay value may be taken directly from one or more bits of the output of the spreading sequence generator. In another example implementation, one or more bits of the output of the spreading sequence generator may be used to select a delay value from a table of delay values. In yet another example implementation, one or more bits of the output of the spreading sequence generator may be used to select adjustable delays that are to be delays in a given clock cycle. One skilled in the art will recognize that other algorithms or techniques may also be used to control the amount of delay.

A number of different circuits may be used to implement the adjustable delay circuits. Propagation delay of each signal line can be influenced by capacitance, resistance or inductance of the signal path circuit. The adjustable delay may include a switchable circuit to adjust the rise and fall of signals based on one or more of these factors. The adjustable delay may also be implemented using one or more switchable buffers, such as an inverter. For example, the delay may be increased by enabling a number of buffers in the signal path. The delay may be decreased by bypassing or disabling one or more of the buffers. One skilled in art will recognize that numerous other circuits may be used to insert delay into signal lines as well.

Figure 3:
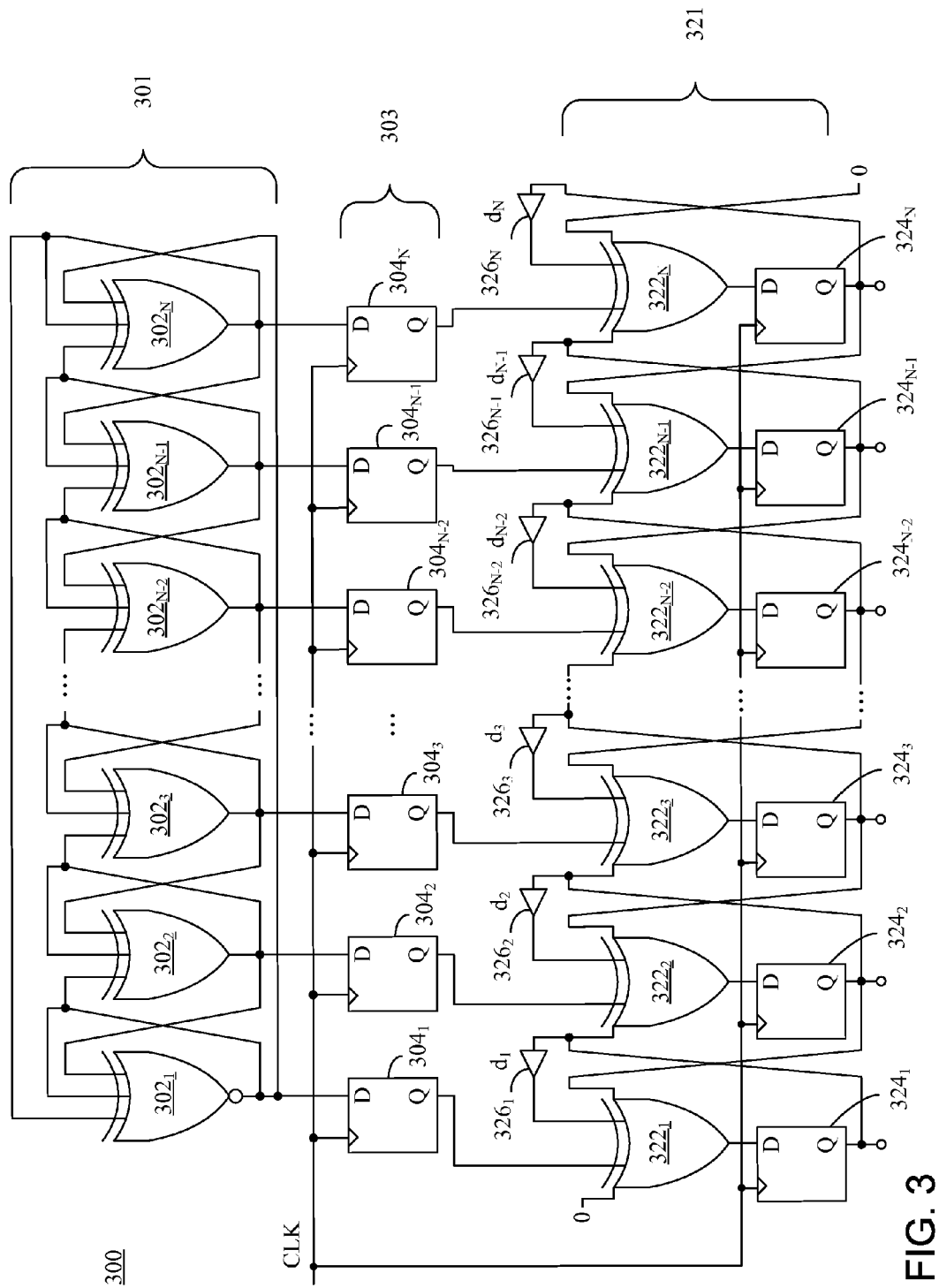
FIG. 3 shows a block diagram of an example random number generator that may be used to implement encryption and decryption circuits in accordance with several embodiments of the invention.

FIG. 3 shows a block diagram of an example random number generator that may be used to generate a spreading sequence in accordance with one or more embodiments of the invention. The random number generator 300 includes a ring oscillator circuit 301, a sampling circuit 303, and a linear feedback shift register (LFSR) circuit 321. The ring oscillator circuit 301 consists of XOR gates $302_1$ through $302_N$ (collectively referred to as XOR gates 302). The XOR gates 302 are interconnected to form a "generalized N-bit ring oscillator" which operates at a first frequency dictated by the operating delay of the implementing circuit. Each one of the XOR-based ring oscillators is connected with its two neighbors (the boundary gates are considered neighbors), thereby creating a ring of oscillators. The ring oscillator circuit 301 is coupled to the sampling circuit 303. The output data terminals of the sampling circuit 303 are coupled to input data terminals of the LFSR 321. The LFSR 321 operates synchronously using a clock signal coupled to the sampling circuit 303. The clock signal operates at a different frequency than the ring oscillator. The LFSR 321 scrambles the output of the sampling circuit 303 to produce high-quality random numbers. The LFSR 321 comprises a set of XOR gates $322_1$ through $322_N$ (collectively referred to as XOR gates 322) and a set of storage cells $324_1$ through $324_N$. In one embodiment, each of the storage cells comprises a D-type flip-flop (collectively referred to as flip-flops 324). The XOR gates 322 and the flip-flops 324 implement an N-cell LFSR. Because the LFSR 321 operates at a different frequency than the ring oscillator 301, truly random N-bit binary numbers have a uniform probability distribution using only digital logic. The operation of this and other random number generators is described in detail in U.S. Pat. No. 7,389,316, which is incorporated by reference herein. Those skilled in the art will recognize that other random or pseudo-random number generators, implemented in hardware or in software, may be used to generate random numbers in accordance with the several embodiments of the invention.

Figure 4:
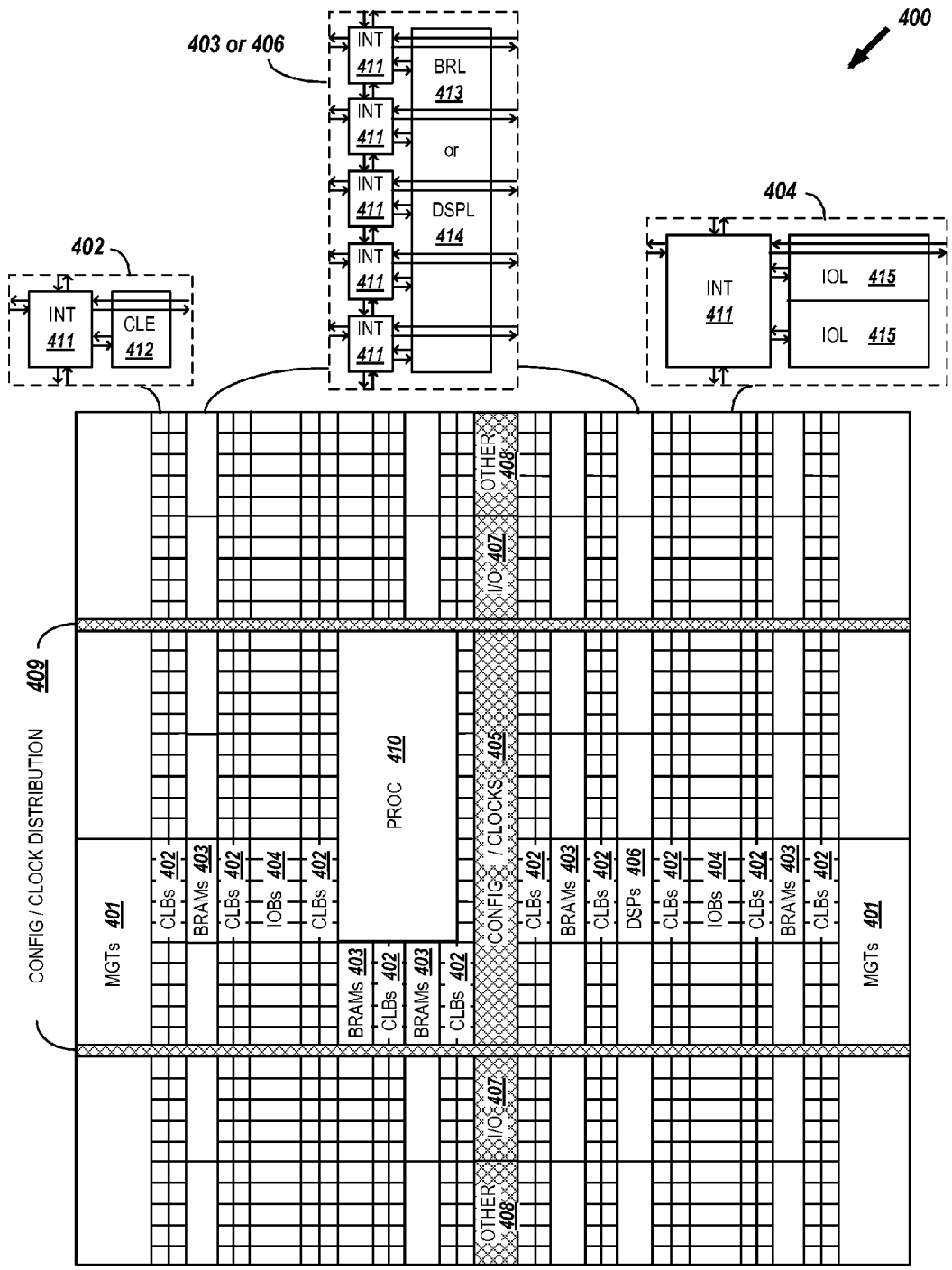
FIG. 4 illustrates a block diagram of a programmable integrated circuit for implementing cryptographic operations in accordance with various embodiments of the invention.

FIG. 4 is a block diagram of an example field programmable gate array (FPGA) which is configurable in accordance with one or more embodiments of the invention. FPGAs can include several different types of programmable logic blocks in the array. For example, FIG. 4 illustrates an FPGA architecture (400) that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407), for example, clock ports, and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic plus a single programmable interconnect element INT 411. A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element INT 411. As will be clear to those of skill in the art, the actual I/O pads connected, for example, to the I/O logic element 415 are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic.

The present invention is thought to be applicable to a variety of systems for encryption and decryption. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A secure cryptographic circuit arrangement, comprising:
   a cryptographic processing block having a plurality of signal paths, each of the signal paths coupled to a respective input of the cryptographic processing block and each of the signal paths including a respective adjustable delay circuit, each adjustable delay circuit coupled to a respective one of the inputs of the cryptographic processing block;
   a spreading sequence generator configured to output a sequence of pseudo-random numbers;
   a delay control circuit having an input coupled to an output of the spreading sequence number generator and having a plurality of outputs coupled to delay adjustment inputs of the adjustable delay circuits, respectively; and
   wherein the delay control circuit is configured to select ones of the adjustable delay circuits to which the respective delay values are input based on one or more bits of each pseudo-random number, and the delay control circuit is configured to adjust respective delay values of the selected ones of the adjustable delay circuits based on respective subsets of bits of each pseudo-random number.

2. The secure cryptographic circuit arrangement of claim 1, wherein the spreading sequence number generator includes:
   a ring oscillator; and
   a linear feedback shift register circuit, having an input coupled to an output of the ring oscillator and an input coupled to the output of the spreading sequence number generator.

3. The secure cryptographic circuit arrangement of claim 2, wherein the ring oscillator is configured to oscillate at a first frequency and the linear feedback shift register is driven by a clock having a second frequency different from the first frequency.

4. The secure cryptographic circuit arrangement of claim 1, wherein:
   the respective delay values are selected from a lookup table according to the pseudo-random number.

5. A method for resisting power analysis during configuration of a programmable integrated circuit (IC), comprising:
   inputting an encrypted bitstream to the programmable IC;
   decrypting the encrypted bitstream with a decryption circuit;
   programming configuration memory of the programmable IC with the decrypted bitstream; and
   concurrently with the decrypting of the encrypted bitstream, adjusting respective delays on selected ones of a plurality of signal paths that input the encrypted bitstream to the decryption circuit to produce power fluctuations that are resistant to power analysis;
   wherein the adjusting respective delays on the selected ones of the plurality of signal paths includes:
      generating a sequence of pseudo-random numbers;
      selecting the ones of the plurality of signal paths based on one or more bits of each pseudo-random number; and
      adjusting respective delays on the selected ones of the plurality of signal paths based on respective subsets of bits of each pseudo-random number.

6. The method of claim 5, wherein:
the selected ones of the signal paths include at least a first signal path and a second signal path; and
adjusting respective delays includes:
setting the delay of the first signal path to a first delay value; and
setting the delay of the second signal path to a second delay value.

7. The method of claim 5, wherein the signal paths are critical signal paths.

8. A method for resisting power analysis during decryption of data in an integrated circuit, comprising:
inputting encrypted data to the integrated circuit;
decrypting the encrypted data with a decryption circuit; and
concurrently with the decrypting of the encrypted data, adjusting respective delays on selected ones of a plurality of signal paths that input the encrypted data to the decryption circuit to produce power fluctuations that are resistant to power analysis;
wherein the adjusting respective delays on the selected ones of the plurality of signal paths includes:
generating a sequence of pseudo-random numbers;
selecting the ones of the plurality signal paths based on one or more bits of each pseudo-random number; and
adjusting respective delays on the selected ones of the plurality of signal paths based on respective subsets of bits of each pseudo-random number.

9. The method of claim 8, wherein:
the selected ones of the signal paths include at least a first signal path and a second signal path; and
adjusting respective delays includes:
setting the delay of the first signal path to a first delay value; and
setting the delay of the second signal path to a second delay value.

10. The method of claim 8, wherein the signal paths are critical signal paths.

11. The method of claim 8, further comprising:
generating noise on a power supply line of the integrated circuit concurrently with the decrypting of the encrypted data.

12. The method of claim 8, wherein adjusting respective delays based on the pseudo-random spreading sequence includes adjusting resistances of the one or more signal paths.

13. The method of claim 8, wherein adjusting respective delays based on the pseudo-random spreading sequence includes adjusting capacitances of the one or more signal paths.

* * * * *